Jan. 22, 1929.   L. BERTELE   1,699,682
OCULAR
Filed April 21, 1925
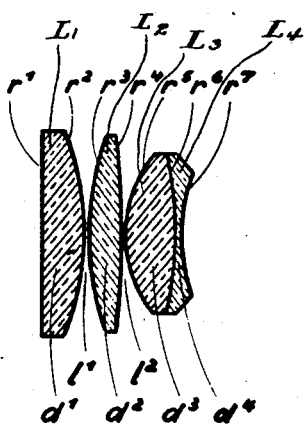
| | | | | | |
|---|---|---|---|---|---|
| $L_1$ | $r_1$  $\infty$ | | | | |
| | $r_2$  $-159.0$ | $d_1 = 25.00$ | | $n_D$  $1.6073$ | $59.5$ |
| $L_2$ | $r_3$  $+180.0$ | $l_1 = 1.00$ | | $n_D$  $1.6073$ | $59.5$ |
| | $r_4$  $-590.0$ | $d_2 = 21.00$ | | | |
| $L_3$ | $r_5$  $+73.3$ | $l_2 = 0.5$ | | $n_D$  $1.4881$ | $70.6$ |
| | $r_6$  $-222.0$ | $d_3 = 31.00$ | | | |
| $L_4$ | $r_7$  $+103.5$ | $d_4 = 2.5$ | | $n_D$  $1.6477$ | $33.9$ |
$F = 100$
Inventor
Ludwig Bertele,
William C. Linton
Attorney.

Patented Jan. 22, 1929.

1,699,682

UNITED STATES PATENT OFFICE.

LUDWIG BERTELE, OF DRESDEN, GERMANY.

OCULAR.

Application filed April 21, 1925, Serial No. 24,889, and in Germany May 2, 1924.

The present invention relates to an ocular with three members standing in air with or without additional collective lens, characterized by the fact that the eye lens is bent through in the shape of a meniscus and the distances between the various lenses are dimensioned in such a way that the radius of the surface of the image in the vicinity of the axis is more than 1.5 times the total focal length of the ocular. The radius R of the surface of the image in the vicinity of the axis is calculated according to the formula of Petzval $$\frac{1}{R} = \Sigma \frac{1}{r} \Delta \frac{1}{n}$$

where $r$ is the radius of the various surfaces and $n$ the refractive exponent for sodium light.

The advantage of the use of an ocular, according to this invention, consists in the image border being free from astigmatism and in the possibility of shortening the telescopes by reducing the focal lengths of their objectives and oculars without the danger of having a worse illustration. In addition a comparatively greater view field of about 70 degrees can be obtained with this ocular.

The improvements in comparison with oculars of ordinary ocnstruction consists in the possibility of increasing the radius of the surface of the image in the vicinity of the axis and therewith also in those sections of the image lying more distant from the axis owing to the use of an eye lens bent in meniscus shape.

The example herein consists of three members standing in air in which the third member is cemented together out of two lenses. The radius of the surface of the image in the example described below amounts to twice the focal length in comparison with ordinary ocular types of 1.10–1.25 times the focal length. This advantage lies in the elimination of every deteriorating influence of the curvature, but above all in the suppression of large air spaces. In the main, the improvement is, however, obtained owing to the use of a strongly bent lens of meniscus-shape turned towards the eye. In consideration of the image curvature, it is of favorable influence to select the thickness of the eye lens as great as possible. By further increasing the thickness of the eye lens and still more strongly bending the eye lens, the radius of the surface of the image in the example referred to can be considerably enlarged. In order to carry through the correction of the distortion, it is necessary to cement together one of the members out of two lenses with great difference of the refractive exponent, possibly over 0.14, the third member being suited best for this purpose. If, in addition, the glasses of the two cemented lenses are selected in such a way that the $\nu$ difference is very great, the chromatic correction can be carried through for many purposes.

If the chromatic correction is to be carried through completely, the introduction of further cemented surfaces is necessary. If the ocular is used with reversing prisms, the complete correction of the chromatic errors can be carried through, according to the invention, with prisms consisting all or in part of glass, the $\nu$ value of which lies under 50.0 where $\nu$ is equal to $$\frac{nD - l}{nF - nC}.$$

The present example is chromatically corrected in combination with prisms, the glass path of which is 500 mm.

If the chromatic correction of the ocular is to be carried through completely without the use of prisms, the introduction of further cemented surfaces is necessary.

The drawing shows an ocular made in accordance with my invention. $L_1$, $L_2$, $L_3$, and $L_4$, represent the several lenses, the lenses $L_3$ and $L_4$ forming a doublet in the shape of a meniscus. The lenses $L_3$ and $L_4$ form a single member of the ocular, while the lenses $L_1$ and $L_2$ each constitute a member. $r_1$, $r_2$, $r_3$, $r_4$, $r_5$, $r_6$, and $r_7$ are the radii of the several surfaces of the lenses. $d_1$, $d_2$, $d_3$, and $d_4$ are the thicknesses of the lenses; and $l_1$, and $l_2$ are respectively air spaces between the lenses $L_1$ and $L_2$, and $L_2$ and $L_3$.

The constructional data of the ocular are as follows:

$l = 96.853$

| | | | | | $\nu$ |
|---|---|---|---|---|---|
| $L_1$ | $r_1$ ∞ | | | | |
| | $r_2 -159.0$ | $d_1 = 25.00$ | | | |
| | | | $n_D$ | 1.6073 | 59.5 |
| | $r_3 +180.0$ | $l_1 = 1.00$ | | | |
| $L_2$ | | | $n_D$ | 1.6073 | 59.5 |
| | $r_4 -590.0$ | $d_2 = 21.00$ | | | |
| | $r_5 + 73.3$ | $l_2 = 0.5$ | | | |
| | | $d_3 = 31.00$ | | | |
| $L_3$ | | | $n_D$ | 1.4881 | 70.6 |
| | $r_6 -222.0$ | $d_4 = 2.5$ | | | |
| $L_4$ | | | $n_D$ | 1.6477 | 33.9 |
| | $r_7 +103.5$ | | | | |

$F = 100.$

I claim:—

1. An ocular comprising in order a front lens (L₁), a second converging lens (L₂) and a lens comprising a doublet including a converging lens (L₃), and diverging lens (L₄), each lens being made and spaced from the others substantially in conformity with the following constructional data:

| | $r_1$ $\infty$ | | | | $\nu$ |
|---|---|---|---|---|---|
| L₁ | | | | $n_D$ 1.6073 | 59.5 |
| | $r_2 -159.0$ | $d_1=25.00$ | | | |
| | $r_3 +180.0$ | $l_1= 1.00$ | | | |
| L₂ | | | | $n_D$ 1.6073 | 59.5 |
| | $r_4 -590.0$ | $d_2=21.00$ | | | |
| | $r_5 + 73.3$ | $l_2= 0.5$ | | | |
| L₃ | | | | $n_D$ 1.4881 | 70.6 |
| | $r_6 -222.0$ | $d_3=31.00$ | | | |
| | | $d_4= 2.5$ | | | |
| L₄ | $r_7 +103.5$ | | | $n_D$ 1.6477 | 33.9 | in which $r_1, r_2, r_3, r_4, r_5, r_6$, and $r_7$ are radii of curvature; $d_1, d_2, d_3$, and $d_4$ lens thicknesses; $l_1$ and $l_2$ spaces between lenses; $n_D$ indices of refraction; and $$\nu = \frac{nD-1}{nF-nC}.$$

2. An ocular comprising two collective lenses separated from each other by a small air space and a thick strongly curved meniscus-shaped lens separated by a small air space from one of said collective lenses, said strongly curved meniscus-shaped lens having its convex part faced towards one of said collective lenses, the several lenses being so dimensioned that the radius of the surface of the image in the vicinity of the axis is more than 1.5 times the total focal length of the ocular.

3. An ocular comprising two collective lenses separated from each other by a small air space and a thick strongly curved meniscus-shaped lens positioned near one of said collective lenses, said strongly curved meniscus-shaped lens having its convex part faced towards one of said collective lenses, the several lenses being so dimensioned that the radius of the surface of the image in the vicinity of the axis is more than 1.5 times the total focal length of the ocular, and one of said three mentioned lenses comprising a doublet, the lenses of which have a great difference of refractive index in order to correct distortion.

4. An ocular comprising two collective lenses having a thick, strongly curved meniscus shaped lens having its convex side turned toward said collective lenses, said lenses being separated by small air spaces whose average thickness is less than the average thickness of all lenses together, said lenses having certain surfaces curved to provide for an image whose radius in the vicinity of the axis is more than 1.5 times the total focal length of the ocular.

5. An ocular comprising two collective lenses having a thick, strongly curved meniscus shaped lens having its convex side toward said collective lenses, the radii of curvature of the external surfaces of said meniscus shaped lens being less than the radii of curvature of the external surface of the second collective lens, said curvatures providing for an image whose radius of curvature in the vicinity of the axis is more than 1.5 times the total focal length of the ocular.

6. An ocular as in claim 5 wherein at least one of said lenses comprises at least two members having a large difference of refractive index.

In witness whereof I have hereunto set my hand.

LUDWIG BERTELE.